(12) United States Patent
Bidwell et al.

(10) Patent No.: US 7,959,176 B2
(45) Date of Patent: Jun. 14, 2011

(54) MANUALLY PROPELLED WHEELCHAIR DEVICE

(76) Inventors: Alan Bidwell, Kyneton (AU); Adrian Bidwell, Bacchus Marsh (AU)

( * ) Notice: Subject to any disclaimer, the term of this patent is extended or adjusted under 35 U.S.C. 154(b) by 529 days.

(21) Appl. No.: 11/908,207

(22) PCT Filed: Feb. 13, 2006

(86) PCT No.: PCT/AU2006/000187
§ 371 (c)(1),
(2), (4) Date: Dec. 24, 2007

(87) PCT Pub. No.: WO2006/094332
PCT Pub. Date: Sep. 14, 2006

(65) Prior Publication Data
US 2009/0039612 A1    Feb. 12, 2009

(30) Foreign Application Priority Data

Mar. 11, 2005 (AU) ................. 2005901224
Apr. 15, 2005 (AU) ................. 2005901917

(51) Int. Cl.
*B62M 1/14* (2006.01)
(52) U.S. Cl. ............... 280/250.1; 280/242.1; 280/304.1
(58) Field of Classification Search ............ 280/250.1, 280/242.1, 304.1, 247, 249; 180/907
See application file for complete search history.

(56) References Cited

U.S. PATENT DOCUMENTS

| | | | | |
|---|---|---|---|---|
| 838,228 A * | 12/1906 | Williams | ............ | 280/7.15 |
| 4,618,155 A * | 10/1986 | Jayne | ............ | 280/5.28 |
| 4,790,548 A * | 12/1988 | Decelles et al. | ............ | 280/5.26 |
| 5,186,269 A | 2/1993 | Avakian et al. | | |
| 5,234,066 A * | 8/1993 | Ahsing et al. | ............ | 180/6.5 |
| 5,306,035 A * | 4/1994 | Counts | ............ | 280/250.1 |
| 5,423,563 A * | 6/1995 | Wild | ............ | 280/250.1 |
| 5,971,091 A * | 10/1999 | Kamen et al. | ............ | 180/218 |
| 6,050,356 A * | 4/2000 | Takeda et al. | ............ | 180/65.1 |
| 6,161,856 A * | 12/2000 | Peterson | ............ | 280/250.1 |
| 6,279,934 B1 * | 8/2001 | Womack | ............ | 280/250.1 |
| 6,644,675 B2 * | 11/2003 | Ellis et al. | ............ | 280/250.1 |
| 2004/0251655 A1 | 12/2004 | Lindsay et al. | | |
| 2010/0117328 A1 * | 5/2010 | Johnson et al. | ............ | 280/250.1 |

FOREIGN PATENT DOCUMENTS

CH 657327 A5 8/1986
EP 0603639 A1 6/1994

* cited by examiner

*Primary Examiner* — Joanne Silbermann
*Assistant Examiner* — Maurice Williams
(74) *Attorney, Agent, or Firm* — Edwin D. Schindler

(57) ABSTRACT

A conveyance has a plurality of wheels and, at least, first and second drive axles, which are mounted, or disposed, between the wheels. One of the wheels defines a first wheel that is rotatably mounted to one end of the first drive axle. A second of the wheels is rotatably mounted to one end of the second drive axle. The conveyance further includes a first actuation device for the first drive axle, on the opposite end of the first drive axle from the first wheel and proximate to the second wheel, and a second actuation device for the second drive axle on the opposite end of the second drive axle from the second wheel and proximate the first wheel. The first actuation device is selectively operated to apply a selective relative rotation to the first wheel and the second actuation device is selectively operated to apply a selective relative rotation to the second wheel.

22 Claims, 10 Drawing Sheets

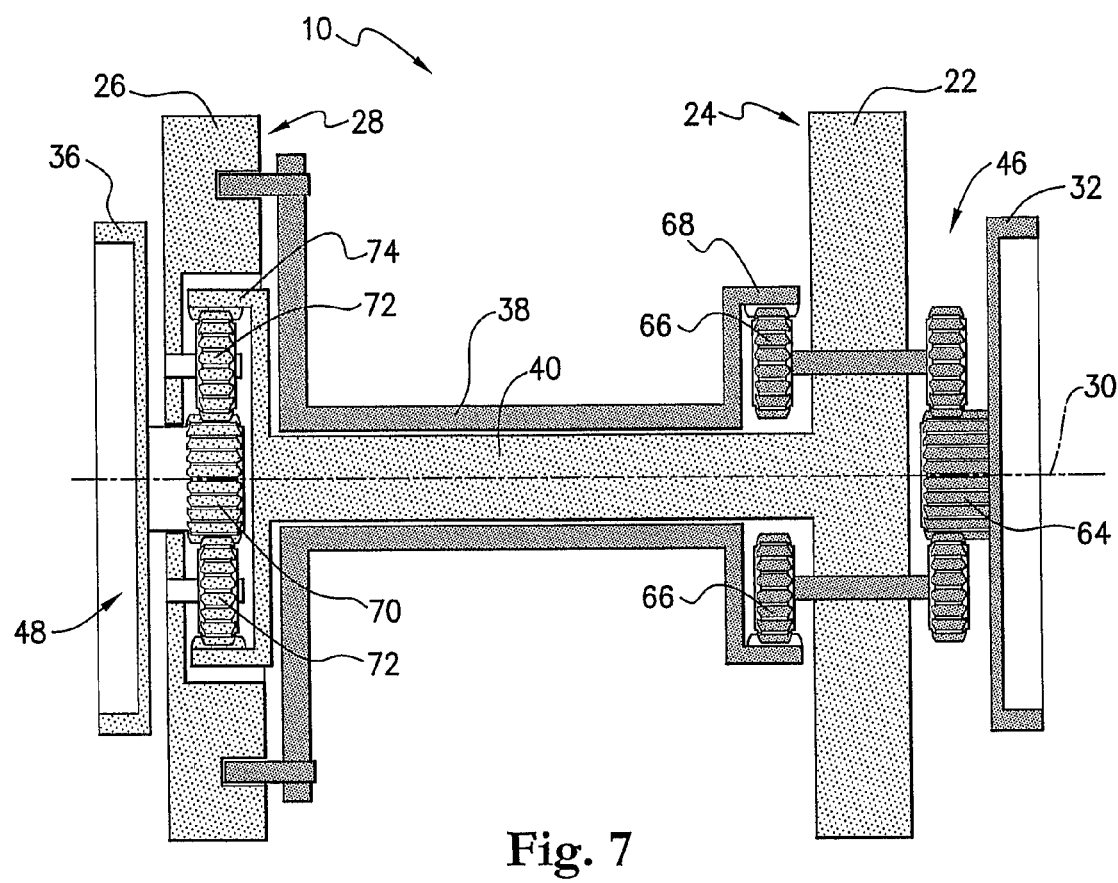
Fig. 7
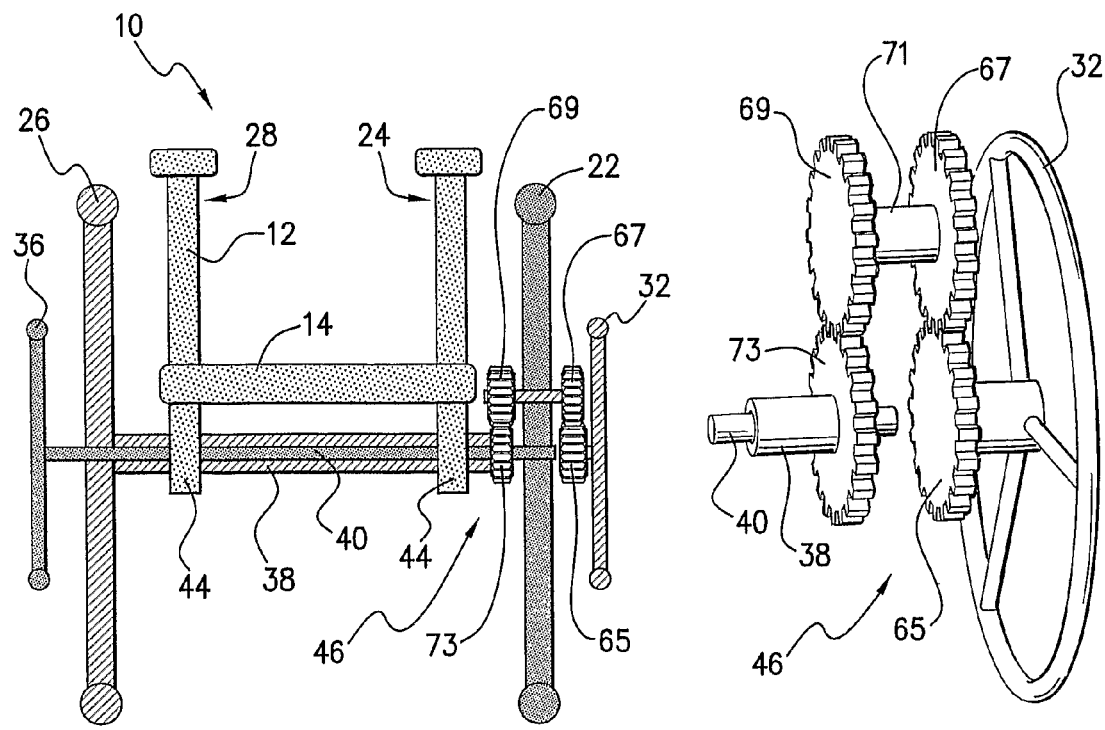
Fig. 8
Fig. 9

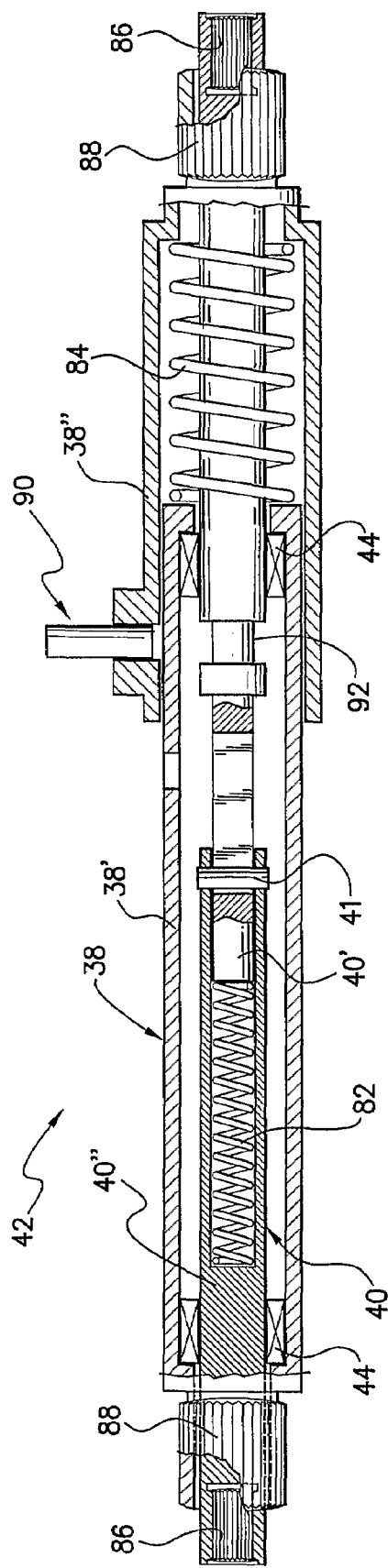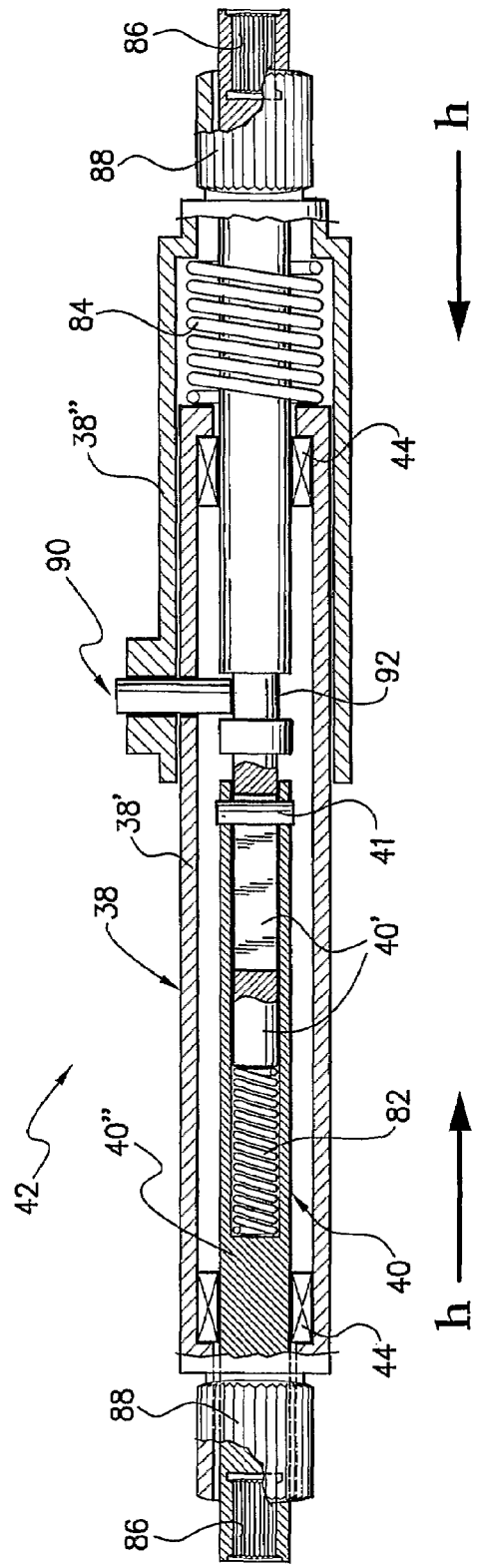
Fig. 11a
Fig. 11b

MANUALLY PROPELLED WHEELCHAIR DEVICE

FIELD OF THE INVENTION

The present invention relates, generally, to wheeled conveyance assemblies and relates particularly, though not exclusively, to a manually-operated wheelchair which can be controlled and steered by either or both arms of an occupant.

Throughout the ensuing description the expressions "single-handed occupant(s)" and "two-handed occupant(s)" are intended to refer to persons who have one or two usable hands or arms respectively.

BACKGROUND OF THE INVENTION

Manually-operated wheelchairs are well known. Most prior art manually-operated wheelchairs have been designed for two-handed operation by persons, as for example paraplegics, having full or partial use of both hands. Typically, a wheelchair is movably supported by two larger rear wheels and two smaller forward (generally swivel-type) wheels. These wheelchairs are manually-driven or operated by an occupant gripping top portions of the larger rear wheels (or hand-rim assemblies directly connected to the rear wheels) and then pushing the wheels in a desired direction to propel the wheelchair in a chosen direction. If an occupant desires to turn the wheelchair in a particular direction, the larger rear wheel on that side of the wheelchair relevant to the direction of turn is pushed more slowly than the opposite rear wheel, which gradually changes the direction of movement of the wheelchair. Sharp turns are generally accomplished by holding one rear wheel stationary whilst pushing the opposite rear wheel in a desired direction. In some cases both rear wheels are propelled in opposite directions to rotate the wheelchair sharply on-the-spot in a desired direction. The smaller forward wheels of the wheelchair generally swivel and follow the arc of rotation of the wheelchair directed by the propulsion applied to the rear wheels.

Two-handed manually operable wheelchairs usually include frames which are collapsible for transportation. A common design for a conventional collapsible two-handed wheelchair includes side-frames which are mounted to scissor-like cross-frame members which enable the opposing side-frames to be drawn together in close proximity to one another, which results in the overall dimensions of the wheelchair being substantially reduced. This collapsible configuration facilitates portability, ease of transportation and storage in, for example, the boot of a vehicle.

A disadvantage associated with one design for conventional two-handed manually-driven wheelchairs is that an occupant must use both arms to manoeuvre the wheelchair at all times. This is most disadvantageous when an occupant needs to carry an object from one point to another, for example from a refrigerator to a kitchen table. It is common practice in situations like this for a wheelchair occupant to balance any load he (or she) wishes to carry on his (or her) lap whilst manoeuvring the wheelchair with both arms.

A further disadvantage with known designs of conventional two-handed wheelchairs is due to the fact that, since they have two large rear drive wheels independently connected to the wheelchair frame, the muscle power of a single arm can only be delivered to a single drive wheel of the wheelchair. If a wheelchair occupant has one arm stronger than the other, the maximum effort in forward movement of the wheelchair is dependent on that of the weakest arm, otherwise the wheelchair would continually turn if uneven strength was to be continually applied to both wheels.

Some manually-driven wheelchairs have also been provided for single-handed operation by persons having use of only a single hand. Typically, single-handed manually-driven wheelchairs provide two individually operable and concentrically positioned hand-rim assemblies mounted on the working-hand side of the wheelchair. Each hand-rim assembly is adapted to drive one wheel of the wheelchair. A first hand-rim assembly is usually directly mounted to the rim of one large rear wheel of the wheelchair, whilst a second hand-rim assembly, generally located adjacent the first hand-rim assembly, is coupled to the opposite rear wheel and is operable in order to drive the opposite rear wheel from the working-hand side of the wheelchair. A single drive axle couples the hub of the rear wheel located on the non-working-hand side to the second hand-rim assembly located on the working-hand side. This arrangement of two hand-rim assemblies located on a single working-side enables an occupant to not only drive the rear wheel adjacent the working-hand, but also the opposite rear wheel located on the opposite side of the wheelchair by way of pushing both hand-rim assemblies together or separately in a desired direction. When both hand-rim assemblies are propelled together, the occupant is able to drive the wheel chair in a relatively straight line by using only a single hand.

One problem associated with single-handed manually-driven wheelchairs is that they are purposely designed for either left or right handed operation, and not both. Such wheelchairs usually require tooling to convert the wheelchair from left-handed drive to right-handed drive operation, depending on which arm an occupant is able to use. A further disadvantage with such prior art single-handed wheelchairs is that they are sometimes not collapsible or do not collapse to a sufficiently compact state, due to the rigid or semi-collapsible drive axle configuration interconnecting the second hand-rim assembly with the rear wheel located on the non-working-hand side of the wheelchair. Usually, in the case of rigid drive axles, the drive axle extends transverse to the side-frames of the wheelchair in a direction substantially parallel to the direction of collapse of what would normally be a conventional collapsible frame, which opposes the collapsible nature of the wheelchair.

Another disadvantage associated with most conventional manually-driven wheelchairs, both two-handed and single-handed operation, is that many wheelchair occupants do not have sufficient upper body strength to traverse inclines or other rugged terrain. The general set-up of a conventional wheelchair results in a 1:1 drive propulsion ratio. As such, many wheelchair occupants are limited in terms of their scope of mobility.

Wheelchair manufacturers tend to use small castor wheels as means for supporting and rotating the forward section of a wheelchair in response to force applied to the larger rear drive wheels. Castor wheels can easily become jammed or snagged against, for example, small ledges, edges of carpet and/or cracks in pavement. With conventional wheelchairs it is common practice to rotate both drive wheels forcefully in opposite directions in order to generate enough rotational force (on a 1:1 drive ratio) at the castor wheels to release the jammed wheel.

With conventional two-handed wheelchairs, when occupants try to traverse an incline they have to be sure that they quickly push, release, and then re-engage the wheels to push again, so as to be sure that the wheelchair does not slip backwards down the incline. If instead the wheelchair occupant tries to drive the wheelchair uphill by releasing one arm from one wheel at a time, the wheelchair will pivot and rotate backwards relative to the wheel that is being held firm. Thus, the only way to navigate a conventional two-handed wheelchair uphill is by way of pushing with both hands against both wheels simultaneously. It therefore becomes evident that, if an operator does not re-engage and push forward again on the wheels of the wheelchair in a manner which is quick enough dependent on the grade of the incline, the wheelchair will roll backwards down the incline.

It is therefore an object of the present invention to provide a manually-driven wheeled conveyance, preferably a wheelchair, which can be propelled and steered by either or both arms of an occupant.

A further object of the present invention is to provide a manually-driven wheeled conveyance, preferably a wheelchair, which can be propelled and steered by either hand of a two-handed person enabling an occupant to use the other hand to carry an object.

Yet a further object of the present invention is to provide a manually-driven wheeled conveyance, preferably a wheelchair, which can be propelled and steered by a single-handed person and which is configured for both left-handed and right-handed drive operation.

SUMMARY OF THE INVENTION

According to the present invention there is provided a conveyance having a plurality of wheels, preferably a wheelchair, said conveyance including:

at least two drive axles adapted to be mounted or disposed between said wheels;

one of said plurality of wheels defining a first wheel, said first wheel being rotatably mounted to one end of a first of said at least two drive axles;

another of said plurality of wheels defining a second wheel, said second wheel being rotatably mounted to one end of a second of said at least two drive axles;

a first actuation means associated with said first drive axle, on the opposite end of said first drive axle from said first wheel and proximate said second wheel;

a second actuation means associated with said second drive axle, on the opposite end of said second drive axle from said second wheel and proximate said first wheel;

wherein said first actuation means is selectively operable to apply a selective relative rotation to said first wheel, and said second actuation means is selectively operable to apply a selective relative rotation to said second wheel.

In a practical preferred embodiment said first and second drive axles are mounted or disposed coaxially between said first and second wheels. Preferably said first drive axle is coaxially disposed within said second drive axle. In an alternative practical preferred embodiment, said first and second drive axles are mounted or disposed between said first and second wheels on separate axes.

Preferably said conveyance is collapsible to reduce its overall dimensions for ease of portability and/or transportation. It is also preferred that said first and second drive axles are removably mounted or disposed between said first and second wheels In a further practical preferred embodiment, said first and second drive axles each include telescoping sections that are adapted to selectively reduce the overall length of said first and second drive axles to enable an occupant to remove said first and second drive axles from said conveyance. Preferably said telescoping sections of said first and second drive axles each cooperate with at least one biasing means which biases said telescoping sections to a fully extended position. It is also preferred that said at least one biasing means biases said first and second drive axles to a fitted position between said first and second wheels of said conveyance, wherein said fitted position of said first and second drive axles is substantially the same as that of said fully extended position. It is further preferred that said first and second drive axles can each be locked in a collapsed position by means of a locking device, to facilitate removal of said first and second drive axles from said conveyance.

Preferably said first and second actuation means is coupled to its respective first or second drive axle via at least one gearing assembly. In a practical preferred embodiment, said at least one gearing assembly is disposed within a hub of at least one of said first or second drive wheels. Preferably said at least one gearing assembly is at least one differential. In one embodiment, said at least one differential includes at least two bevel gears associated with at least one pinion gear. In an alternative embodiment, said at least one differential is a planetary gear system including at least one ring gear associated with at least one planet gear and at least one sun gear. In either embodiment, it is preferred that said at least one differential is adapted to provide a 2:1 drive propulsion ratio.

In yet a further practical preferred embodiment, each of said first and second actuation means is coupled to its respective first or second drive axle via at least one gearing assembly, preferably at least one differential. Preferably each differential coupled to each of said first and second drive axles can be locked by at least one arrester adapted to be removably attached to said conveyance in order provide a predetermined drive propulsion ratio relative to use of said first and second actuation means. Preferably said predetermined drive propulsion ratio is a 2:1 drive propulsion ratio. It is also preferred that said arresters are adapted to be coupled to said differentials in place of said first and second drive axles when said first and second drive axles are removed from said conveyance. In an alternative practical preferred embodiment, only one of said first and second actuation means in coupled to its respective first or second drive axle via at least one gearing assembly, preferably at least one differential, and wherein the other of said first or second actuation means is directly mounted to its respective first or second drive axle.

Preferably said first and second actuation means are drive or actuation discs which can each be separately engaged and manipulated by an occupant to each selectively rotate said first and second wheels of said conveyance.

Preferably a hand-rail means is associated with each of said first and second wheels. It is also preferred that each of said hand-rail means is removably coupled to its respective first or second wheel.

In yet a further practical preferred embodiment, each of said first and second drive axles includes at least one universal joint disposed at or near its outer ends thereof. Said universal joints allowing said first and second wheels to move freely in all directions relative to said first and second drive axles.

According to a further aspect of the present invention there is provided an improved drive system for a conveyance having at least one pair of opposed drive wheels, said improved drive system including:

at least two axles adapted to be mounted or disposed between said wheels, each of said axles being adapted to be in direct drive connection with opposed ones of said wheels;

at least one drive means associated with at least one of said wheels and in drive connection with one of said axles; and means associated with each wheel, for selective manipulation by an occupant of said conveyance, to allow for rotation of said wheels.

In a practical preferred embodiment, said at least two drive axles are adapted to be mounted or disposed coaxially between said wheels. Preferably a first of said at least two drive axles is coaxially disposed within a second of said at least two drive axles. In an alternative practical preferred embodiment, said at least two drive axles are adapted to be mounted or disposed between said wheels on separate axes.

Preferably said at least two drive axles are adapted to be removably mounted or disposed between said wheels. In a practical preferred embodiment, said at least two drive axles each include telescoping sections that are adapted to selectively reduce the overall length of said at least two drive axles to enable an occupant to remove said at least two drive axles from said conveyance. Preferably said telescoping sections of said at least two drive axles each cooperate with at least one biasing means which biases said telescoping sections to a fully extended position. It is also preferred that said at least one biasing means biases said at least two drive axles to a fitted position between said wheels of said conveyance, wherein said fitted position of said at least two drive axles is substantially the same as that of said fully extended position. It is further preferred that said at least two drive axles can each be locked in a collapsed position by means of a locking device, to facilitate removal of said at least two drive axles from said conveyance.

Preferably said means associated with each wheel are actuation means which are coupled to opposed ones of said wheels via said at least two axles. Preferably at least one of said actuation means is coupled to its respective drive axle via said at least one drive means. Preferably said at least one drive means is at least one gearing assembly. It is also preferred that said at least one gearing assembly is disposed within a hub of at least one of said wheels. It is further preferred that said at least one gearing assembly is at least one differential. Preferably said at least one differential is adapted to provide a 2:1 drive propulsion ratio. In a practical preferred embodiment, each of said actuation means are coupled to their respective drive axle via at least one gearing assembly. In an alternative practical preferred embodiment, said improved drive system includes two actuation means, and only one of said actuation means in coupled to its respective drive axle via at least one gearing assembly, and wherein the other of said actuation means is directly mounted to its respective drive axle.

In a further practical preferred embodiment said actuation means are drive or actuation discs which can each be separately engaged and manipulated by an occupant to each selectively rotate said wheels of said conveyance.

In yet a further practical preferred embodiment each of said at least two drive axles includes at least one universal joint disposed at or near its outer ends thereof. Preferably said universal joints allow said wheels to move freely in all directions relative to said at least two drive axles.

According to yet a further aspect of the present invention there is provided a conveyance having at least one pair of opposed drive wheels, said conveyance including the improved drive system as described in any one of the preceding paragraphs. Preferably the conveyance is a wheelchair.

According to yet a further aspect of the present invention there is provided a dual axle assembly for a conveyance having at least one pair of opposed drive wheels, said dual axle assembly including a first and a second drive axle adapted to be mounted or disposed between said wheels, wherein said first and second axles are adapted to be in direct drive connection with opposed ones of said wheels.

In a practical preferred embodiment said first and second drive axles are adapted to be mounted or coaxially disposed between said wheels. Preferably said first drive axle is coaxially disposed within said second drive axle. In an alternative practical preferred embodiment, said first and second drive axles are adapted to be mounted or disposed between said wheels on separate axes.

Preferably said dual axle assembly is adapted to be removably mounted or disposed between said wheels. In a practical preferred embodiment said first and second drive axles each include telescoping sections that are adapted to selectively reduce the overall length of said first and second drive axles to enable an occupant to remove said dual axle assembly from said conveyance. Preferably said telescoping sections of said first and second drive axles each cooperate with at least one biasing means which biases said telescoping sections to a fully extended position. It is also preferred that said at least one biasing means biases said dual axle assembly to a fitted position between said wheels of said conveyance, wherein said fitted position of said dual axle assembly is substantially the same as that of said fully extended position. It is further preferred that said first and second drive axles can each be locked in a collapsed position by means of a locking device, to facilitate removal of said dual axle assembly from said conveyance.

Preferably each of said first and second drive axles includes at least one universal joint disposed at or near its outer ends thereof. Preferably said universal joints allow said wheels to move freely in all directions relative to said dual axle assembly.

ADVANTAGES OF THE INVENTION

Accordingly, the present invention provides a manually-driven wheeled conveyance, preferably a wheelchair, which can be selectively operated by either or both hands of an occupant allowing the occupant to use a free hand to hold an object, if desired, whilst still being able to control and steer the conveyance from one side with a single hand. The wheeled conveyance of the present invention can be controlled and steered by one or two arms of an occupant by using the actuation means or the drive wheels, either separately or in combination. If one actuation means is held together with its adjacent drive wheel, both drive wheels become joined as one. The resulting action of this function allows the wheeled conveyance to be propelled in a straight line by an occupant using only one arm. Furthermore, the occupant can selectively release his (or her) grip on the actuation means being held together with its adjacent drive wheel and rotate either the actuation means or drive wheel separately, this function providing a means of rotating or steering the wheeled conveyance with a single arm as desired.

The wheeled conveyance of the present invention may therefore be used by single-handed occupants having either only a left-arm or a right-arm. Thus the wheeled conveyance is a universal device for a single-handed occupant that does not require any modification to suit a particular arm of an occupant, as the conveyance can be controlled and steered from either side by default.

If the wheeled conveyance of the present invention includes differential gearing systems disposed in working relationship with the two drive wheels and actuation means, a means for averaging the strength of both arms of a two-handed occupant is provided. If an occupant selectively holds at least one of the two actuation means together with at least one adjacent drive wheel, the power applied by the occupant to both wheels and the at least one actuation means held together with the adjacent drive wheel averages the strength of the individual when propelling the wheeled conveyance in a desired direction.

If the wheeled conveyance includes differential gearing with a 2:1 drive propulsion ratio the power required to turn the wheeled conveyance by way of the actuation means alone is half that which would be required to apply a turning force to the drive wheels alone. If an occupant selectively rotates the two actuation means in opposite directions they can deliver twice the turning force to the front, preferably castor wheels, of the conveyance which provides greater force to release the front wheels should they become jammed against an object.

The wheeled conveyance of the present invention can be used to traverse an incline in the same manner as a conventional conveyance. However, it is also possible with the wheeled conveyance of the present invention for an occupant to release one hand at a time from one wheel held in cooperation with a corresponding actuation means, as the wheel that is no longer grasped is interconnected with the wheel and the adjacent actuation means that are being held firm. Thus an occupant can selectively propel the wheeled conveyance of the present invention up an incline using varying force applied to the wheels and actuation means by one arm at a time.

If the axles are embodied to be removably attached to the wheeled conveyance of the present invention the conveyance can include a collapsible frame so that the conveyance can be folded to reduce its overall dimensions for ease of portability and/or transportation and/or storage. Further, by being able to remove the axles of the wheeled conveyance, a pair of arresters or the like can be connected to the wheeled conveyance in place of the axles in order to lock the gearing assemblies of each hub in a constant, preferably, 2:1, drive propulsion ratio relative to use of the actuation means.

BRIEF DESCRIPTION OF THE DRAWINGS

In order that the invention may be more clearly understood and put into practical effect there shall now be described in detail preferred constructions of a manually propelled wheelchair device in accordance with the invention. The ensuing description is given by way of non-limitative example only and is with reference to the accompanying drawings, wherein:

FIG. 7 is a partial cross-sectional view of an improved drive system for a wheeled conveyance made in accordance with a third preferred embodiment of the invention;

FIG. 8 is a partial cross-sectional view of an improved drive system for a wheeled conveyance made in accordance with a fourth preferred embodiment of the invention;

FIG. 9 is an enlarged cross-sectional view of the gearing arrangement of the improved drive system shown in FIG. 8;

FIG. 11a is a cross-sectional view of a preferred axle assembly for use with any one of the wheeled conveyances shown in FIGS. 1 to 10b, showing the axle assembly in an extended position;

FIG. 11b is a similar view to that of FIG. 11a, this time showing the axle assembly in a retracted or collapsed position;

DETAILED DESCRIPTION OF THE PREFERRED EMBODIMENTS

Figures 1, 2:
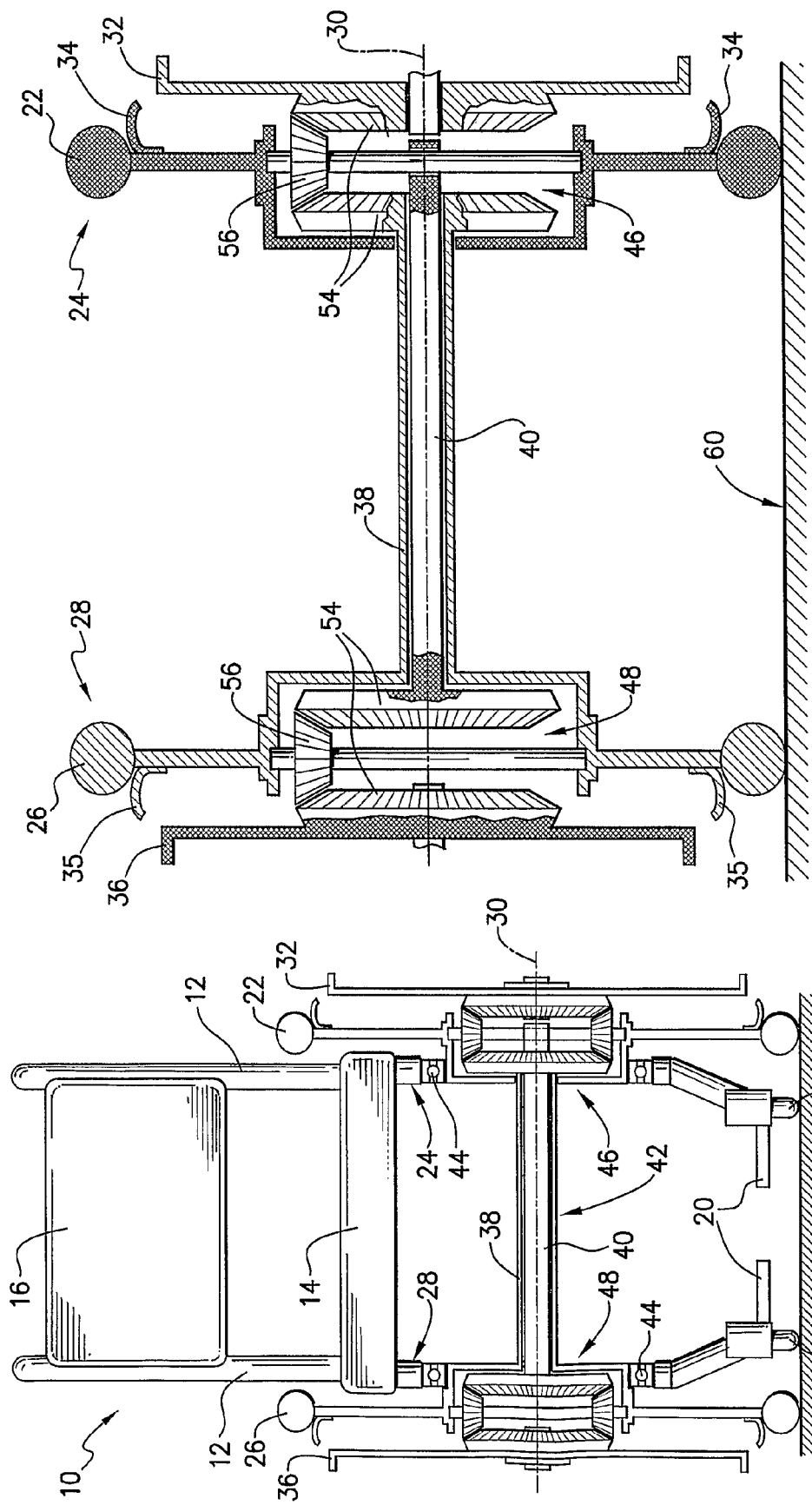
FIG. 1 is a front elevational view of a wheeled conveyance made in accordance with a first preferred embodiment of the present invention.
FIG. 2 is a cross-sectional view of an improved drive system for the wheeled conveyance shown in FIG. 1.

In FIG. 1 there is shown a wheeled conveyance 10 of any suitable form, for example a wheelchair as shown. Wheelchair 10 includes a frame 12 which carries and supports a seat 14, a backrest 16 and a pair of armrests (not shown). Armrests usually extend outwardly from frame 12, near backrest 16, in a direction substantially parallel to the plane of seat 14. Wheelchair 10 may also include a pair of hand-push handles 18 (see for example FIG. 5) disposed at the uppermost points of frame 12 and which may extend outwardly therefrom in a direction substantially perpendicular to frame 12 and away from the rear of wheelchair 10. Mounted to the base of frame 12 are footrests 20 which are disposed in a position suitable to support the feet of an occupant (not shown). Although shown in FIG. 1 as being two separate footrests 20, it should be understood that a single footrest 20 (see FIG. 5) could be included and the invention is therefore not limited to the specific example as shown.

Wheelchair 10 includes a first drive wheel 22 rotatably mounted to a first side 24 of frame 12 and a second drive wheel 26 rotatably mounted to a second side 28 of frame 12. First and second drive wheels 22, 26 are substantially aligned to rotate about a substantially horizontal common wheel axis 30. A first hand-rim assembly 32 is operably mounted proximate, preferably adjacent, first drive wheel 22 for selective manual operation thereof. A second hand-rim assembly 36 is operably mounted proximate, preferably adjacent, second drive wheel 26 also for selective manual operation thereof. A first elongated, preferably detachable, drive axle member 38 is coupled between first hand-rim assembly 32 and second drive wheel 26. First drive axle member 38 is substantially aligned to rotate about common wheel axis 30. A second elongated, preferably detachable, drive axle member 40 is coupled between second hand-rim assembly 36 and first drive wheel 22. Second drive axle member 40 is also substantially aligned to rotate about common wheel axis 30.

Figures 10A, 10B:
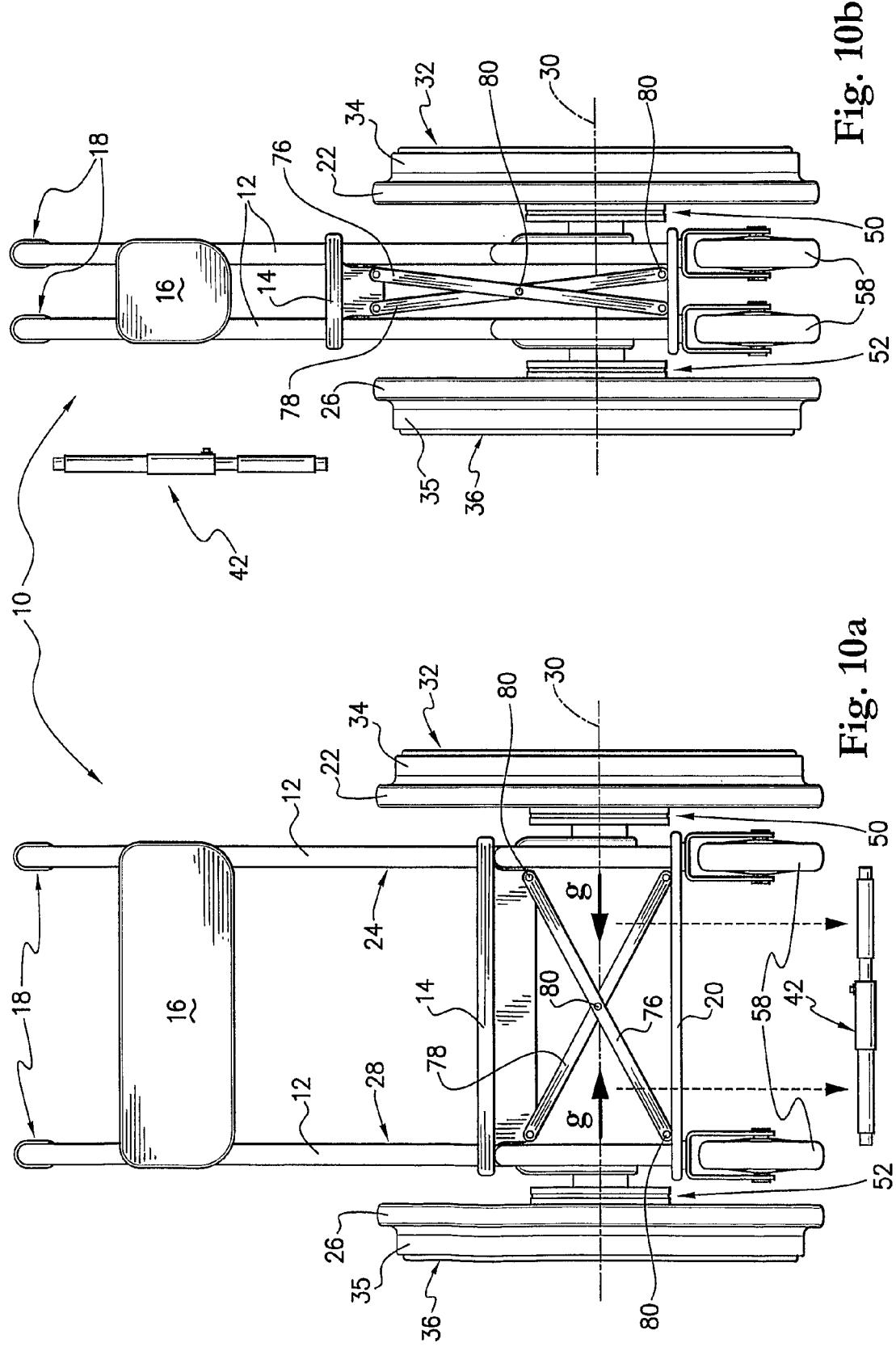
FIG. 10a is a front elevational view of the wheeled conveyance of FIG. 4, showing the axle assembly removed from the wheeled conveyance so that the wheeled conveyance may be folded for storage or transportation.
FIG. 10b is a similar view to that of FIG. 10a, this time showing the wheeled conveyance in a folded position.

The arrangement of first and second drive axle members 38, 40 is such that both together as one unit make up a dual axle assembly 42 which is preferably detachable from wheelchair 10 (see for example FIGS. 10a & 10b). In the preferred embodiments described with reference to the drawings accompanying the present specification first drive axle member 38 is coaxially aligned with second drive axle member 40, and both drive axles 38, 40, together as dual axle assembly 42, are substantially aligned to rotate about common wheel axis 30. As can be best seen in FIG. 2, second drive axle member 40 is preferably housed within first drive axle member 38 such that dual axle assembly 42 includes inner and outer axles coaxially aligned with one another to rotate substantially about common wheel axis 30.

Although shown in the drawings as being coaxially aligned, one within the other, it should be understood that first drive axle member 38 and second drive axle member 40 could alternatively be disposed separately, as two separate single axle assemblies 42. Axles 38, 40 could be arranged, for example, parallel to one another such that first drive axle member 38 could rotate about common wheel axis 30, whilst second drive axle member 40 could rotate about a second parallel wheel axis (not shown). In this alternative preferred embodiment (not shown) first and second drive wheels 22, 26 may be, for example, disposed offset from one another in order to rotate about separate parallel wheel axes.

As shown in FIG. 1, first and second drive axle members 38, 40 are supported and rotatably mounted to frame 12 of wheelchair 10 by bearings 44. Disposed at one end of first drive axle member 38, relative to first side 24 of frame 12, is a first differential gearing assembly 46. Disposed at one end of second drive axle member 40, relative to second side 28 of frame 12 and opposite first differential gearing assembly 46, is a second differential gearing assembly 48. Differential gearing assemblies 46, 48 are preferably housed within first and second hubs 50, 52 (see for example FIG. 5) of first and second drive wheels 22, 26, respectively.

Figure 3A:
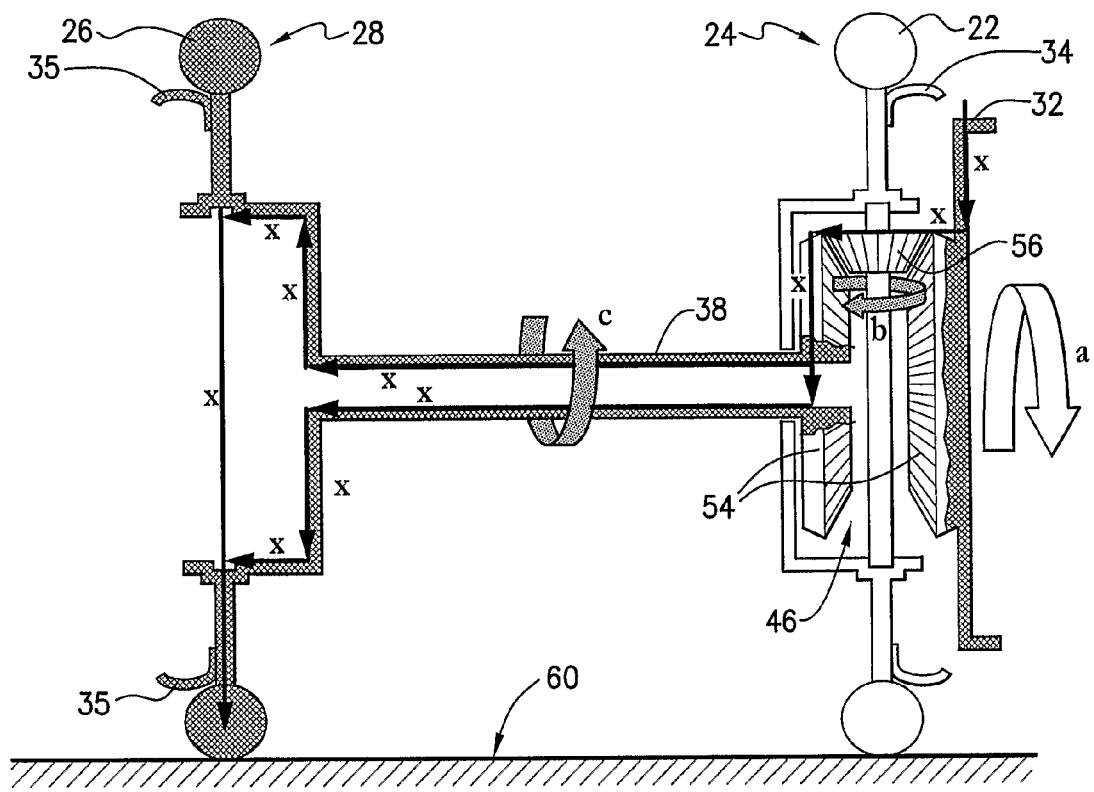
FIGS. 3a & 3b are partial cross-sectional views of the improved drive system of FIG. 2, each showing the drive system in a different mode of operation.
Figure 3B:
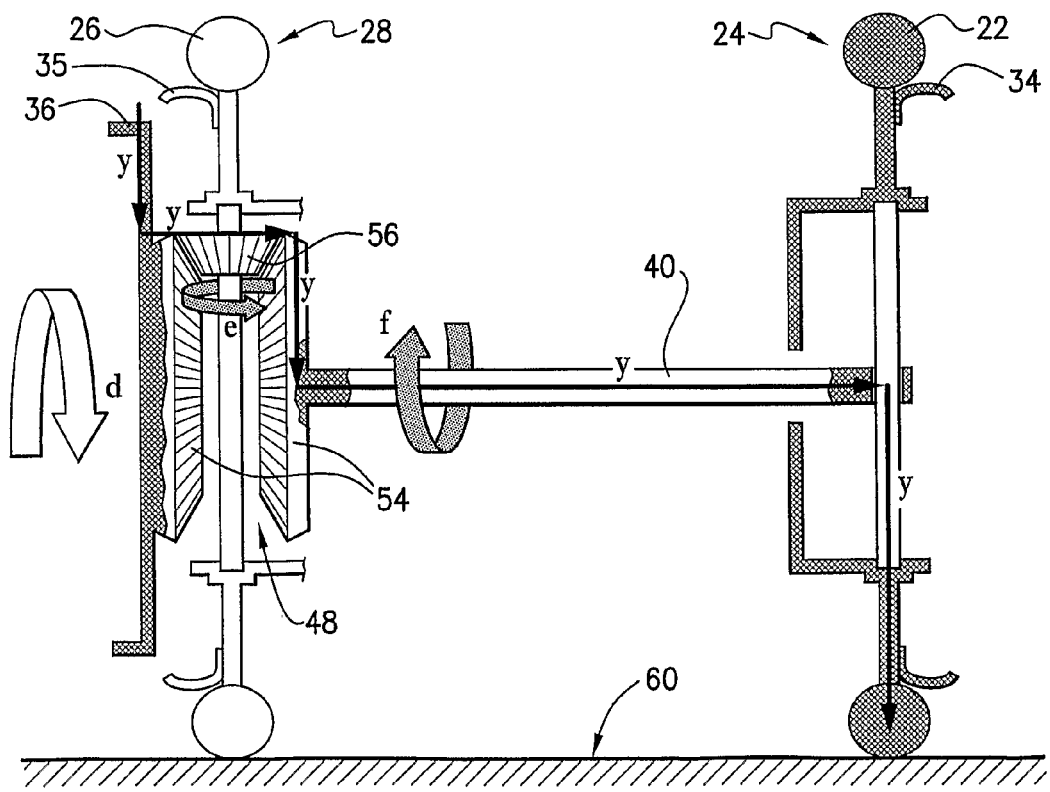
Figure 5:
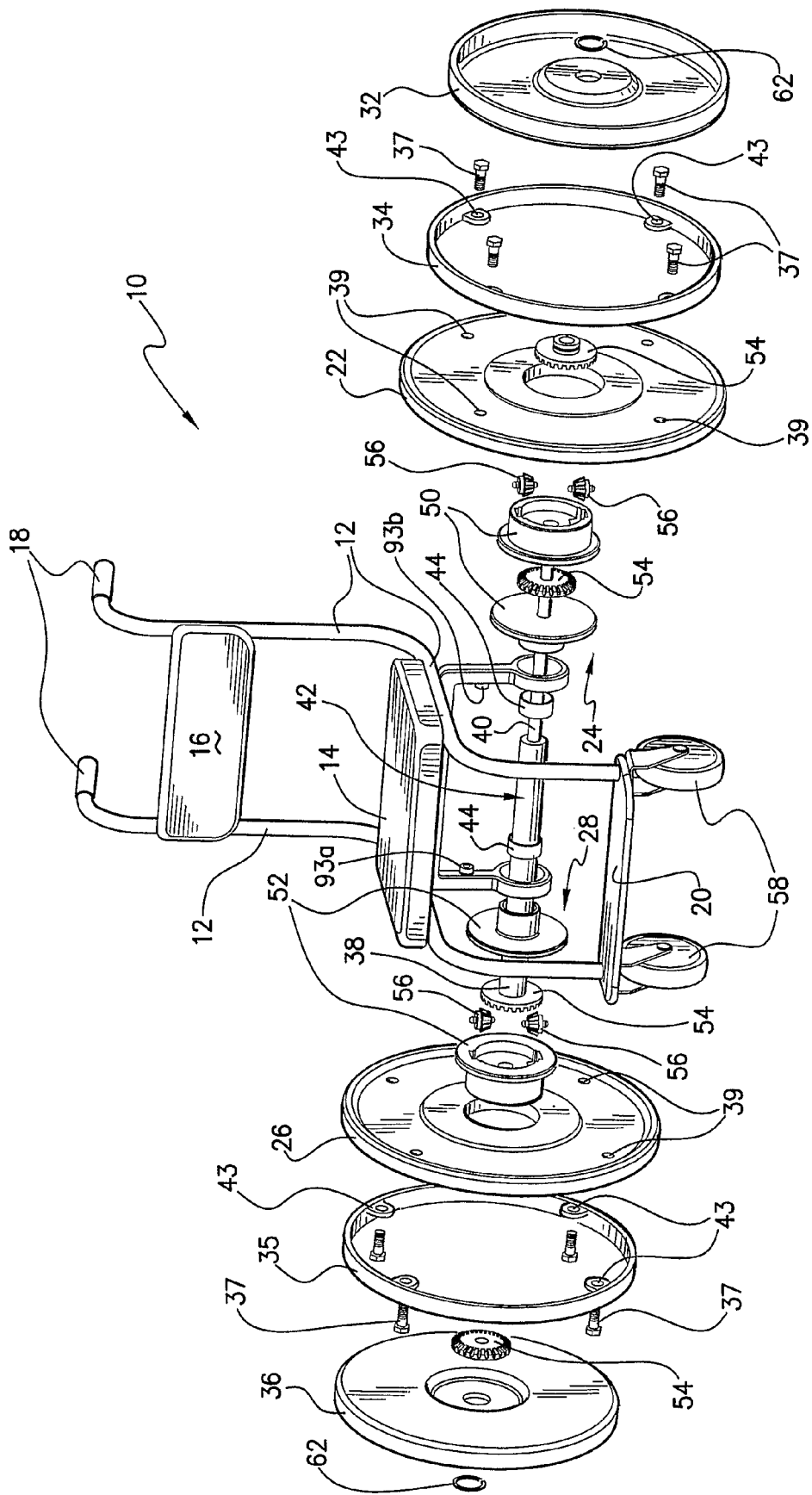
FIG. 5 is an exploded perspective view of the wheeled conveyance shown in FIG. 4.

As best seen in FIGS. 2 to 3b, each differential gearing assembly 46, 48 includes two bevel gears 54 cooperating in working relationship with one pinion gear 56. It should be understood, however, that two pinion gears 56 (as is shown in FIG. 5) could be included and, as such, the invention should not be considered limited to the specific arrangement as shown. Similarly, although embodied as only including a single differential gearing assembly 46, 48 disposed at either side 24, 28 of frame 12, in an alternative embodiment (not shown) more than one differential gearing assembly may be included, if required, without departing from the spirit and scope of the present invention as herein described.

As shown in FIG. 1, wheelchair 10 also includes a pair of forward non-driven wheels 58. Forward wheels 58 are preferably castor wheels but may be any other suitable wheels that are adapted to swivel and/or turn in order to follow the path directed by propulsion applied to first and second drive wheels 22, 26 by an occupant (not shown).

As shown in FIGS. 2 to 3b, first and second drive wheels 22, 26 may also each include a hand-rail 34, 35 for selective propulsion to be applied thereto. First hand-rail 34 is integral with or removably connected (see for example FIG. 5) to first drive wheel 22, whilst second hand-rail 35 is integral with or removably connected to second drive wheel 26. First and second hand-rails 34, 35 can be used by an occupant (not shown) to selectively propel first and second drive wheels 22, 26, instead of directly pushing on first and second drive wheels 22, 26.

As can be seen in FIG. 2, first differential gearing assembly 46 interconnects first hand-rim assembly 32 with second drive wheel 26 via first (outer) drive axle member 38. Second differential gearing assembly 48 interconnects second hand-rim assembly 36 with first drive wheel 22 via second (inner) drive axle member 40. The arrangement of first and second hand-rim assemblies 32, 36, first and second drive axle members 38, 40, and first and second differential gearing assemblies 46, 48 provides wheelchair 10 with an improved drive system that enables an occupant (not shown) to selectively operate either or both hand-rim assemblies 32, 36 in order to selectively drive either or both interconnected drive wheels 22, 26 from respective sides 24, 28 of wheelchair 10. It should be understood that, although shown as having first drive axle member 38 interconnecting first hand-rim assembly 32 with second drive wheel 26, and second drive axle member 40 interconnecting second hand-rim assembly 36 with first drive wheel 22, either drive axle member 38, 40 could be used to interconnect either hand-rim assembly 32, 36 with respectively opposed drive wheels 22, 26 (see for example FIG. 5 which shows a reverse arrangement of axles 38, 40 to that shown in FIGS. 2 to 3b).

Reference will now be made to FIGS. 3a & 3b in an effort to provide a better understanding of the operation of the improved drive system for a wheeled conveyance, preferably wheelchair 10, of the present invention.

In FIG. 3a the power train of the improved drive system of the present invention is shown when a selective (anticlockwise) motion is applied to first hand-rim assembly 32 in the direction of arrow a. As first hand-rim assembly 32 is directly coupled to one bevel gear 54 of first differential gearing assembly 46 this bevel gear 54 rotates with first hand-rim assembly 32 in the direction of arrow a. As this bevel gear 54 is disposed in working relationship with pinion 56, pinion 56 is driven by bevel gear 54 in the (clockwise) direction of arrow b. As pinion 56 is also coupled to the remaining bevel gear 54, which in turn is directly coupled to first (outer) drive axle member 38, the (clockwise) rotation of pinion 56 in the direction of arrow b causes remaining bevel gear 54 and first drive axle member 38 to rotate (clockwise) in the direction of arrow c. The interconnection of first drive axle member 38 with second drive wheel 26 thus causes second drive wheel 26 to rotate against a surface 60 also in the (clockwise) direction of arrow c. Rotation of second drive wheel 26 in the direction of arrow c causes wheelchair 10 to rotate in a clockwise direction relative to stationary first drive wheel 22. Thus it can be seen that power is applied to second drive wheel 26 from first hand-rim assembly 32 via first differential gearing assembly 46 and first (outer) drive axle member 38 in the direction of arrows x.

In FIG. 3b the power train of the improved drive system of the present invention is shown when a selective (clockwise) motion is applied to second hand-rim assembly 36 in the direction of arrow d. As second hand-rim assembly 36 is directly coupled to one bevel gear 54 of second differential gearing assembly 48 this bevel gear 54 rotates with second hand-rim assembly 36 in the direction of arrow d. As this bevel gear 54 is disposed in working relationship with pinion 56, pinion 56 is driven by bevel gear 54 in the (anticlockwise) direction of arrow e. As pinion 56 is also coupled to the remaining bevel gear 54, which in turn is directly coupled to second (inner) drive axle member 40, the (anticlockwise) rotation of pinion 56 in the direction of arrow e causes remaining bevel gear 54 and second drive axle member 40 to rotate (anticlockwise) in the direction of arrow f. The interconnection of second drive axle member 40 with first drive wheel 22 thus causes first drive wheel 22 to rotate against surface 60 also in the (anticlockwise) direction of arrow f. Rotation of first drive wheel 22 in the direction of arrow f causes wheelchair 10 to rotate in an anticlockwise direction relative to stationary second drive wheel 26. Thus it can be seen that power is applied to first drive wheel 22 from second hand-rim assembly 36 via second differential gearing assembly 48 and second (inner) drive axle member 40 in the direction of arrows y.

If either hand-rim assembly 32, 36 is selectively rotated in a reverse direction to that described above with reference to FIGS. 3a & 3b, then the resultant movement of wheelchair 10 would be opposite to that already described. That is to say that selective rotation of first hand-rim assembly 32 in the reverse (clockwise) direction of arrow a will cause second drive wheel 26 to rotate (anticlockwise) against surface 60 in the reverse direction of arrow c which will in turn cause wheelchair 10 to rotate anticlockwise relative to stationary first drive wheel 22. Likewise, motion applied to second hand-rim assembly 36 in the reverse (anticlockwise) direction of arrow d will cause first drive wheel 22 to rotate (clockwise) against surface 60 in the reverse direction of arrow f which results in wheelchair 10 rotating clockwise relative to stationary second drive wheel 26. The improved drive system of wheelchair 10 can therefore be selectively used to rotate wheelchair 10 in a desired direction by the use of only a single hand.

Wheelchair 10 is also designed to be manoeuvred by two-handed operation. If an occupant (not shown) should choose to use two-hands and, for example, rotate first hand-rim assembly 32 in one direction whilst rotating second hand-rim assembly 36 in an opposite direction, wheelchair 10 will rotate on-the-spot (within its own space). If the gearing of differential gearing assemblies 46, 48 was to be embodied with a preferably 2:1 ratio between pinions 56 and respective bevel gears 54, the effort required to perform this on-the-spot rotation would be half that of alternatively directly rotating first and second drive wheels 22, 26 in opposite directions. Thus a 2:1 drive propulsion ratio as a result of this preferable gearing arrangement will result in half the work being required to, for example, release a jammed forward wheel 58 should it become snagged on any object.

The improved drive system of the present invention also provides an occupant with a means for driving wheelchair 10 in a straight line by the use of either or both arms. If an occupant should choose to use a single-arm to propel wheelchair 10 in a straight line, that person can do so by holding either one of hand-rim assemblies 32, 36 whilst also holding a corresponding proximate, preferably adjacent, drive wheel 22, 26. If one hand-rim assembly, for example first hand-rim assembly 32, is held together with its corresponding proximate, preferably adjacent, drive wheel 22, 26, ie: first drive wheel 22, by selectively applying a driving force to both the hand-rim assembly (32) and drive wheel (22) together, wheelchair 10 can be driven in a straight line as both drive wheels 22, 26 become locked-up as one by way of the interconnection provided by respective drive axle members 38, 40. Therefore, forward or reverse movement of wheelchair 10 can be achieved by the use of only a single arm by selective operation of either of first or second hand-rim assemblies 32, 36 held in co-operation with either of first or second drive wheels 22, 26.

If an occupant has use of two-hands, wheelchair 10 enables the occupant to propel and steer wheelchair 10 with one arm whilst leaving one arm free to hold an object if desired. Likewise, a single-handed occupant is also able to propel and steer wheelchair 10 from either side 24, 28 of wheelchair 10 corresponding to the hand they have use of.

If a two-handed occupant should choose to propel wheelchair 10 with both arms they can do so equally as well by using first and second hand-rim assemblies 32, 36 alone, or by using first and second drive wheels 22, 26 alone as is conventional. If an occupant chooses to hold at least one of first and second hand-rim assemblies 32, 36 with at least one corresponding proximate, preferably adjacent, drive wheel 22, 26, wheelchair 10 can be propelled as desired whilst also providing a means of averaging the strength of the individual and delivering this average strength to both drive wheels 22, 26. This action is provided by the locked arrangement between respective drive wheels 22, 26, which results in at least one drive wheel 22, 26 receiving a driving force from an occupants arm located on an opposite side 24, 28 of wheelchair 10.

In FIGS. 4 to 6b there is shown a wheeled conveyance 10, of any suitable type, for example a wheelchair as shown, made in accordance with a second preferred embodiment of the present invention. In FIG. 5 it can be seen that a preferable construction of wheelchair 10 is shown in exploded view in order to highlight the individual components that make up the improved drive system of the present invention. As already discussed, either drive axle member 38, 40 can be interchanged with one another, and in FIG. 5 the axles 38, 40 are shown in a reverse configuration to that of FIG. 2 in order to exemplify this option. What is also shown in these Figures is the arrangement of first and second differential gearing assemblies 46, 48 being housed within first and second hubs 50, 52 of first and second drive wheels 22, 26, respectively. Hubs 50, 52 house respective differential gearing assemblies 46, 48, each having two bevel gears 54 and two pinions 56, preferably configured in a 2:1 drive arrangement, such that when assembled (FIG. 4) the entire drive arrangement of wheelchair 10 is maintained by way of locking nuts or rings 62.

Referring particularly to FIG. 5, it can be seen that first and second hand-rim assemblies 32, 36 are preferably first and second drive discs which can be selectively rotated by either hand of an occupant (not shown). The particular configuration of drive discs 32, 36 is such that, when fitted to wheelchair 10 (see FIGS. 6a & 6b), they preferably fit under and within hand-rails 34, 35 of first and second drive wheels 22, 26, making it easy for an occupant to selectively grip either or both drive discs 32, 36 and/or hand-rails 34, 35, either separately or together.

In FIG. 5, unlike in the embodiment of FIG. 2, hand-rails 34, 35 are shown as separate components which can be removably attached to respective drive wheels 22, 26, by way of screws or bolts 37. When attached to drive wheels 22, 26, screws 37 affix hand-rails 34, 35 to drive wheels 22, 26 by way of a series of threaded holes 39 formed in drive wheels 22, 26, and a matching series of integral shoulder sections 43 provided on hand-rails 34, 35. By being removably attachable to first and second drive wheels 22, 26, first and second hand-rails 34, 35 can be selectively removed from wheelchair 10, if necessary, in order to provide, for example, more room for an occupant (not shown) to access and use first and second drive discs 32, 36. When hand-rails 34, 35 are removed from wheelchair 10 and wheelchair 10 is fully assembled a space (see for example the wheelchair 10 shown in FIGS. 7 & 8) is provided between first and second drive wheels 22, 26, and first and second drive discs 32, 36, which enables an occupant to more easily selectively operate either a drive wheel 22, 26 or a drive disc 32, 36, on their own. The removability of hand-rails 34, 35 is particularly useful for when axle assembly 42 of wheelchair 10 is removed and a pair of arresters 83a, 83b are connected to wheelchair 10 in order to lock differential assemblies 46, 48 in a predetermined drive propulsion ratio in accordance with a further aspect of the present invention, as will be described later with reference to FIGS. 12 to 13b.

Figure 4:
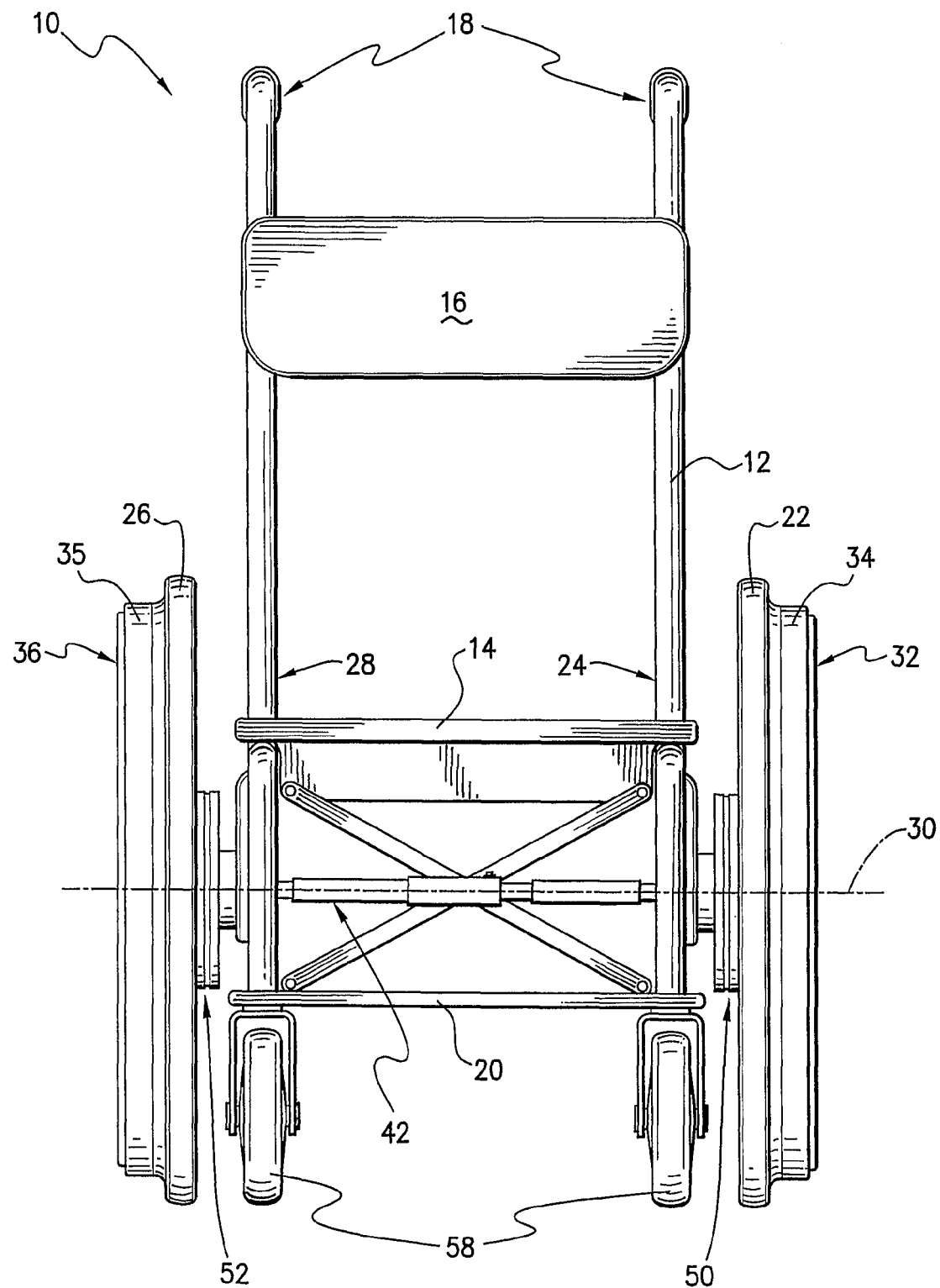
FIG. 4 is a front elevational view of a wheeled conveyance made in accordance with a second preferred embodiment of the present invention.
Figures 6A, 6B:
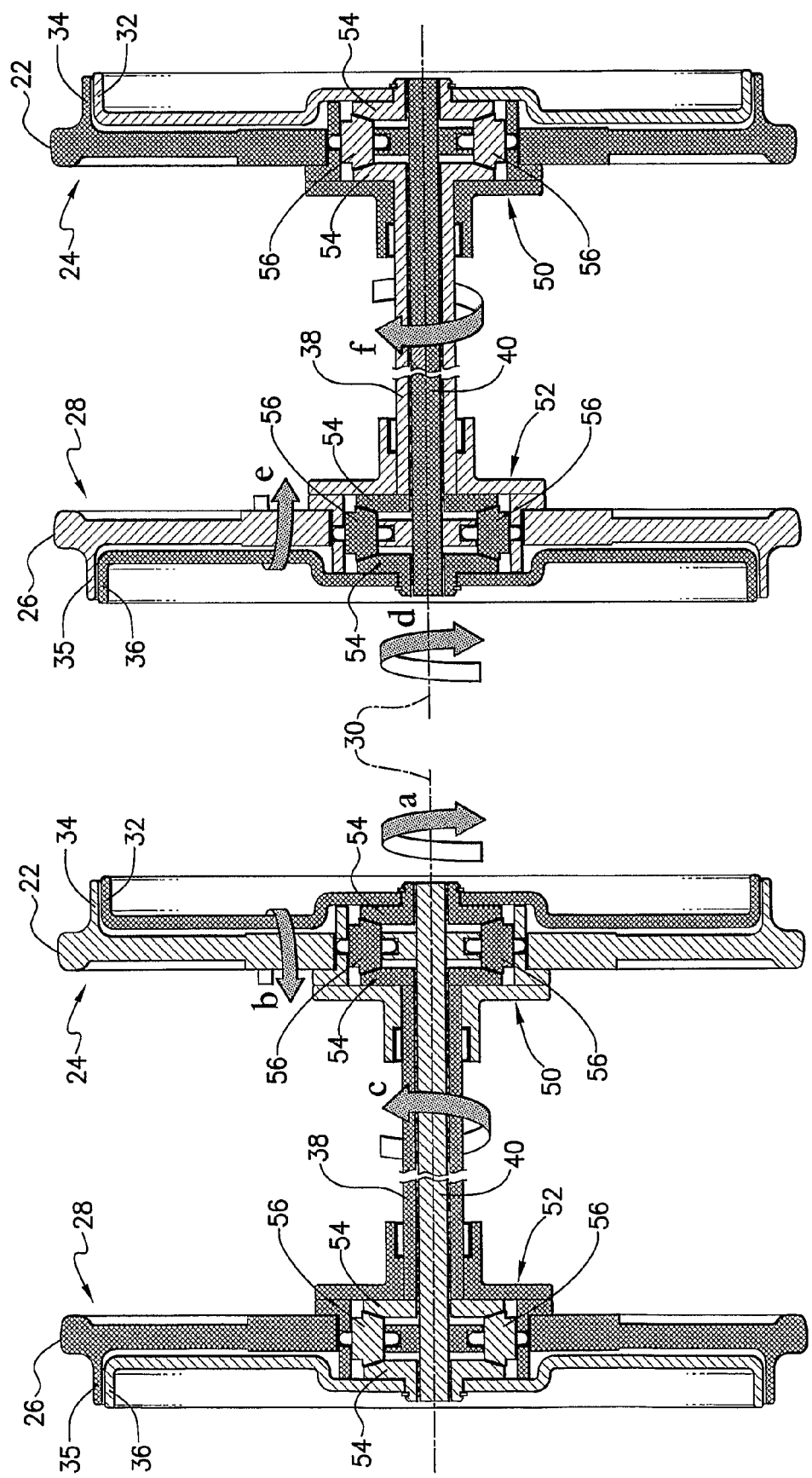
FIGS. 6a & 6b are partial cross-sectional views of an improved drive system for the wheeled conveyance shown in FIG. 4, each showing the drive system in a different mode of operation.

In FIGS. 6a & 6b the power train of the improved drive system of wheelchair 10 shown in FIGS. 4 & 5 is shown in similar (cross-sectional) views to that of FIGS. 3a & 3b. In each of these representations the individual components that are each used to apply the power to the respective drive wheels 22, 26 are shown as darker shaded components for exemplary purposes only.

In FIG. 6a the power train of wheelchair 10 is shown when a selective (anticlockwise) motion is applied to first drive disc 32 in the direction of arrow a. As before, selective rotation of first drive disc 32 causes a first bevel gear 54 of first differential gearing assembly 46 to also rotate in the direction of arrow a. This bevel gear 54 subsequently rotates pinions 56 (clockwise) in the direction of arrow b. Pinions 56 then rotate remaining bevel gear 54 and first drive axle member 38 in the (clockwise) direction of arrow c, which also rotates second drive wheel 26 in the (clockwise) direction of arrow c, which causes wheelchair 10 to rotate clockwise relative to stationary first drive wheel 22. Should a reverse (clockwise) force be applied to first drive disc 32 in the reverse direction of arrow a wheelchair 10 will rotate in an anticlockwise direction, as already explained with reference to FIG. 3a.

In FIG. 6b the power train of wheelchair 10 is shown when a selective (clockwise) motion is applied to second manual drive disc 36 in the direction of arrow d. As before, selective rotation of second drive disc 36 causes a first bevel gear 54 of second differential gearing assembly 48 to also rotate in the direction of arrow d. This bevel gear 54 subsequently rotates pinions 56 (anticlockwise) in the direction of arrow e. Pinions 56 then rotate remaining bevel gear 54 and second drive axle member 40 in the (anticlockwise) direction of arrow f, which also rotates first drive wheel 22 in the (anticlockwise) direction of arrow f, which causes wheelchair 10 to rotate anticlockwise relative to stationary second drive wheel 26. Should a reverse (anticlockwise) force be applied to second drive disc 36 in the reverse direction of arrow d, wheelchair 10 will rotate in a clockwise direction as already explained with reference to FIG. 3b.

Although shown in FIGS. 1 to 6b as including differential gearing assemblies 46, 48 having bevel gears 54 each cooperating with at least one pinion gear 56, the invention is not to be considered to be limited to this particular arrangement of gears. In FIG. 7 one of possibly many alternative preferred differential gearing arrangements for a wheeled conveyance 10 is shown which includes two planetary gearing assemblies 46, 48 arranged at opposite sides 24, 28 of a wheeled conveyance 10. Referring to first planetary gearing assembly 46, it can be seen that first hand-rim assembly 32 is directly coupled to a first sun gear 64. First sun gear 64 is disposed in working relationship with two first planet gears 66, which are in turn disposed in working relationship with one first ring gear 68. As first ring gear 68 is preferably directly coupled to first (outer) drive axle member 38, rotation of first ring gear 68 in either an anticlockwise or clockwise direction will cause first drive axle member 38, and interconnected second drive wheel 26, to rotate in the same direction. Thus wheeled conveyance 10 will rotate in either direction relative to stationary first drive wheel 22 as described before with reference to preceding embodiments.

Referring to second planetary gearing assembly 48, it can be seen that second hand-rim assembly 36 is directly coupled to a second sun gear 70. Second sun gear 70 is disposed in working relationship with two second planet gears 72, which are in turn disposed in working relationship with one second ring gear 74. As second ring gear 74 is preferably directly coupled to second (inner) drive axle member 40, rotation of second ring gear 74 in either an anticlockwise or clockwise direction will cause second drive axle member 40, and interconnected first drive wheel 22, to rotate in the same direction. Thus wheeled conveyance 10 will rotate in either direction relative to stationary second drive wheel 26 as described before with reference to preceding embodiments.

Although shown in FIGS. 1 to 7 as including two gearing assemblies 46, 48, one disposed at each side 24, 28 of the wheeled conveyance 10 of the preceding embodiments, the invention is not limited to this particular arrangement of gearing assemblies 46, 48. In FIG. 8 one of possibly many alternative preferred gearing arrangements is shown which includes a single gearing assembly 46 disposed at one side 24 of a wheeled conveyance 10. Although shown in FIG. 8 as being disposed at side 24 of wheeled conveyance 10 it should be understood that single gearing assembly 46 may alternatively be located at opposite side 28 of wheeled conveyance 10 and as such the invention should not be considered limited to the specific example as shown. Referring to single gearing assembly 46 (in enlarged view in FIG. 9 and having first drive wheel 22 removed for illustrative purposes only), it can be seen that first hand-rim assembly 32 is directly coupled to a first gear 65. First gear 65 is disposed in working relationship with a second gear 67 which is preferably located above first gear 65 but may be located at any other suitable location. Second gear 67 is directly coupled to a third gear 69 via a shaft or axle 71. Shaft 71 preferably passes through the hub (not shown) of first drive wheel 22 in order to interconnect first, second and third gears 65, 67, 69 with a fourth gear 73 which in turn is preferably directly coupled to first (outer) drive axle member 38. The arrangement of gears 65, 67, 69, 73 of single gearing assembly 46 facilitates selective rotation of first (outer) drive axle member 38 in response to force applied to first hand-rim assembly 32 in either a clockwise or anticlockwise direction. As first (outer) drive axle member 38 is directly coupled to second drive wheel 26, selective rotation of first hand-rim assembly 32 in turn causes second drive wheel 26 to rotate in either a clockwise or anticlockwise direction.

Although wheeled conveyance 10 of FIGS. 8 and 9 only includes a single gearing assembly 46 arranged at one side 24 of wheeled conveyance 10, selective rotation of second hand-rim assembly 36 still facilitates rotation of first drive wheel 22 by way of each component being directly coupled to dual axle assembly 42. Instead of having a second gearing assembly arranged at side 28 of wheeled conveyance 10, second hand-rim assembly 36 is directly coupled to second (inner) drive axle member 40 which preferably passes through the hub (not shown) of second drive wheel 26. As second hand-rim assembly 36 is directly coupled to second (inner) drive axle member 40 which in turn is directly coupled to first drive wheel 22, a second gearing assembly is not required. Hence, first and second hand-rim assemblies 32, 36, of wheeled conveyance 10 of FIGS. 8 and 9, can each be selectively rotated as hereinbefore described and still achieve a similar result.

In accordance with the present invention, dual drive axle assembly 42 may be embodied as completely detachable from wheelchair 10. This detachable configuration of dual axle assembly 42 is particularly suitable for a collapsible wheelchair 10 of the type illustrated in FIGS. 4 to 6b and 10a & 10b. To facilitate the collapsible configuration of wheelchair 10, collapsible frame 12 includes front and rear support arms 76, 78 which are pivotally connected together by a series of pivot pins 80, such that frame 12 may be collapsed into the position shown in FIG. 10b. Pivot pins 80 extend centrally through support arms 76, 78, in a direction which is transverse to the longitudinal length of arms 76, 78. Once dual axle assembly 42 has been detached and removed (FIG. 10a), wheelchair frame 12 can be collapsed inwardly in the direction of arrows g into the position shown in FIG. 10b, and in a manner similar to most conventional manually driven wheelchairs with collapsible frames.

In FIGS. 11a & 11b there is shown two separate representations of a preferred detachable dual axle assembly 42, which is suitable for use with any one of the preferred wheeled conveyances 10 previously described.

In FIG. 11a, dual axle assembly 42 is shown in an extended position which would be substantially the same position to that if fitted to a wheeled conveyance 10. Dual axle assembly 42 includes an outer axle 38 and an inner axle 40 coaxially aligned, one within the other, both adapted to rotate about a common axis. To support inner axle 40 within outer axle 38, bearings 44 are disposed toward the outer edges of inner axle 40 such that inner axle 40 can freely rotate therebetween.

Inner axle 40 includes first and second separate sections 40', 40" which are disposed in a telescoping arrangement in order that first (male) section 40' is adapted to be slidably received within second (female) section 40". To bias first section 40' to an extended position of inner axle 40, a first spring 82 is disposed within second section 40" of inner axle 40. To maintain first and second sections 40', 40" in drive relationship with one another an inner axle drive pin 41 is disposed to restrict any rotational movement between sections 40', 40" of inner axle 40. Outer axle 38 also includes first and second separate sections 38', 38" which are disposed in a telescoping arrangement in order that first (male) section 38' is adapted to be slidably received within second (female) section 38". To bias first section 38' to an extended position of outer axle 38, a second spring 84 is disposed within second section 38" of outer axle 38.

Dual axle assembly 42 includes inner and outer splines 86, 88 for receiving on opposed outer ends respective drive wheels 22, 26 and hand-rim assemblies 32, 36. Although shown in the drawings as having matched inner and outer splines 86, 88 at respective ends of axle assembly 42, it should be understood that the configuration of splines 86, 88, or any other suitable means, may differ in accordance with the configuration of the gearing assemblies 46, 48 to which axle assembly 42 is to be attached. For example, if axle assembly 42 were to be connected to the wheelchair 10 shown in FIG. 12, respective inner and outer splines 86, 88 would not be matched at each end of axle assembly 42, and instead respective ends of inner and outer axles 40, 38, of axle assembly 42, would have opposed male and female inner and outer splines. Similarly, although shown in the drawings as having an inner spline 86 extending beyond the outer peripheral edge of outer spline 88, at each end of axle assembly 42, it should be understood that inner and outer splines 86, 88 may be flush at the outer peripheral edge of axle assembly 42.

Dual axle assembly 42 also includes a latching mechanism 90 which is adapted to be operable in order to lock axle assembly 42 into the compressed or retracted position shown in FIG. 11b. In a preferred embodiment, latching mechanism 90 can be engaged and pushed into contact with a groove 92 formed on first section 40' of inner axle 40. When required, the ends of axle assembly 42 near inner and outer splines 86, 88 can be held firm and drawn together in the direction of arrows h (FIG. 11a) in order to retract axle assembly 42 to reduce its overall length. When axle assembly 42 is retracted far enough for latching mechanism 90 to be engaged with groove 92, latching mechanism 90 can be pushed into engagement with groove 92 which will maintain axle assembly 42 in the retracted state shown in FIG. 11b. Thus, and when required, an occupant of a wheeled conveyance 10 may selectively retract dual axle assembly 42 and lock axle assembly 42 in a retracted state with latching mechanism 90 to selectively detach and remove axle assembly 42 from wheeled conveyance 10 in order to, for example, collapse the same for transportation. Similarly, and when required, an occupant may re-position axle assembly 42 and release latching mechanism 90 in order to return axle assembly 42 to its extended position (FIG. 11a) to refit axle assembly 42 to wheeled conveyance 10.

Figure 13A:
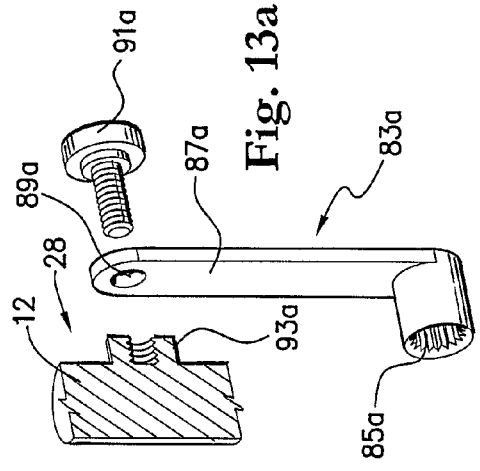
FIGS. 13a & 13b are enlarged cross-sectional views of the respective dashed-line sections of FIG. 12.
Figure 13B:
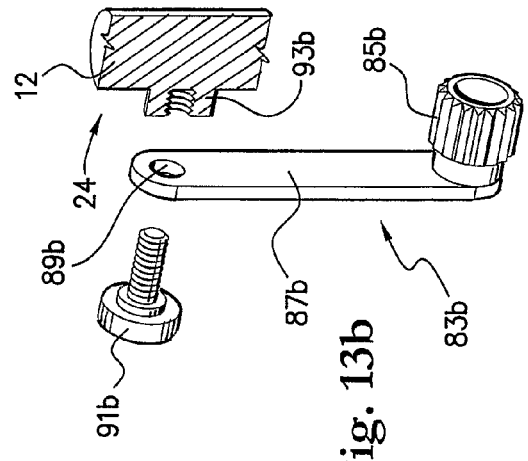
Figure 12:
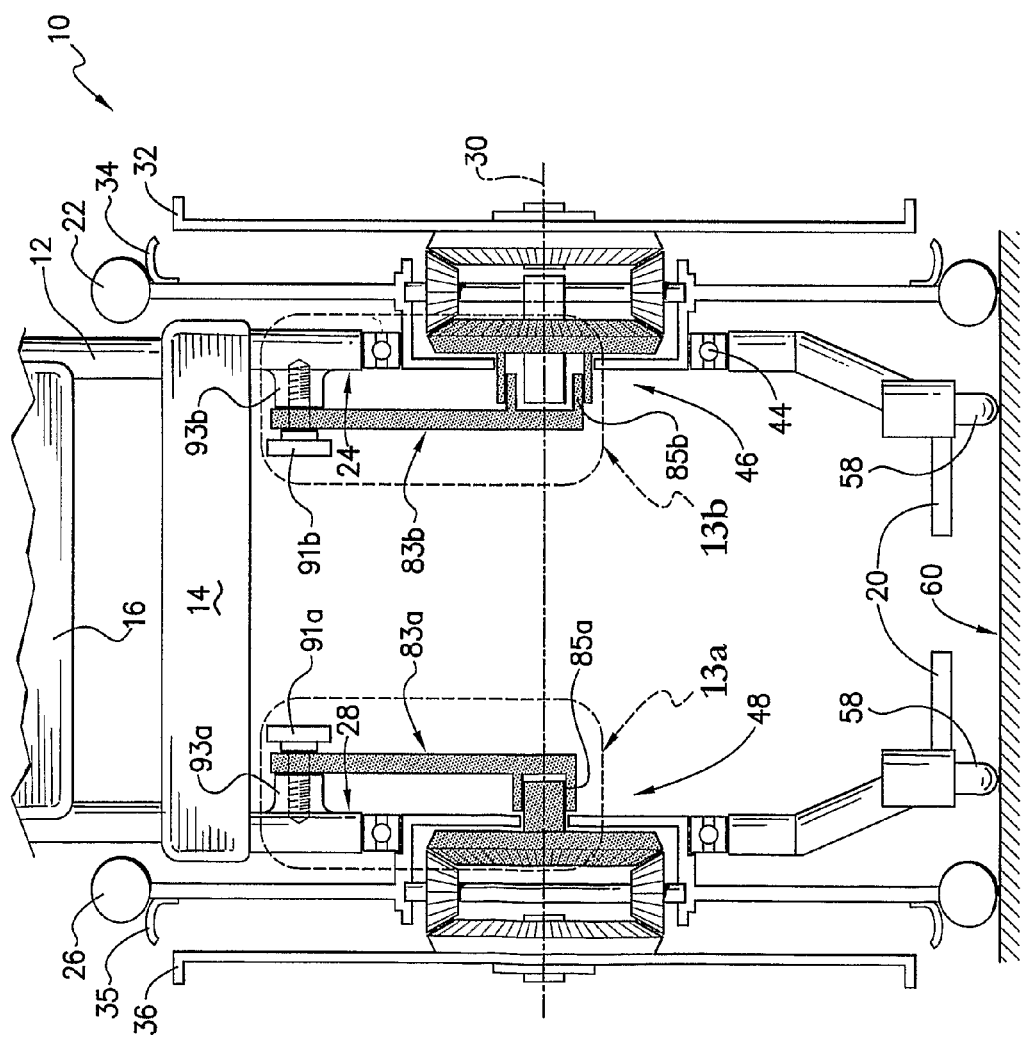
FIG. 12 is a partial cross-sectional view of a wheeled conveyance made in accordance with a fifth preferred embodiment of the present invention, showing an axle assembly removed from the wheeled conveyance and in its place a pair of arresters connected thereto, which, in accordance with a further aspect of the present invention, provides a means of manoeuvring the wheeled conveyance at a preferred constant 2:1 drive propulsion ratio by using the hand-rim assemblies of the wheeled conveyance.

In FIGS. 12 to 13b, there is shown a wheeled conveyance 10, of any suitable type, for example a wheelchair as shown, made in accordance with a fifth preferred embodiment of the present invention. Although not shown in the drawings, wheelchair 10 is also configured to receive a removable dual axle assembly 42, such as that shown and described with reference to FIGS. 11a & 11b. Hence, wheelchair 10 can operate in the same or similar fashion to that described with reference to FIGS. 4 to 6b and 10a & 10b.

In accordance with a further aspect of the present invention, FIGS. 12 to 13b show the connection of a pair of preferred arresters 83a, 83b to respective differential gearing assemblies 46, 48 of wheelchair 10, instead of a dual axle assembly 42. The connection of arresters 83a, 83b to wheelchair 10 provides wheelchair 10 with a means of locking differential gearing assemblies 46, 48 in a predetermined, preferably 2:1, drive propulsion ratio relative to the selective operation of first and second hand-rim assemblies 32, 36.

Referring to FIG. 12, and in the enlarged views of FIGS. 13a & 13b, it can be seen that a first arrester 83a (FIG. 13a) can be removably connected to differential gearing assembly 48 of wheelchair 10 at side 28, and a second arrester 83b (FIG. 13b) can be removably connected to differential gearing assembly 46 at side 24 of wheelchair 10. First and second arresters 83a, 83b each include a spline 85a, 85b disposed at one end of an elongated arm 87a, 87b, and a hole 89a, 89b disposed at the other end thereof. Arresters 83a, 83b are each removably attachable to wheelchair 10 by way of a screw or bolt 91a, 91b, which is received in holes 89a, 89b and is used to affix arresters 83a, 83b to sides 28, 24, of frame 12, of wheelchair 10. Screws 91a, 91b being connectable to frame 12, at sides 28, 24, by way of a pair of threaded bosses or captively held nuts 93a, 93b.

In the preferred embodiment shown in FIGS. 12 to 13b, splines 85a, 85b of arresters 83a, 83b, are matched to the respective differential gearing assembly 48, 46 of wheelchair 10 to which they are removably attachable to, which results in first arrester 83a having a female spline 85a and second arrester 83b having a male spline 85b. It should be understood that splines 85a, 85b could be configured to suit any number of varying differential gearing assemblies 48, 46 and as such the invention is not limited to the specific example provided.

When connected to wheelchair 10 (see FIG. 12), arresters 83a, 83b lock differential gearing assemblies 48, 46 relative to frame 12. The locked arrangement of gearing assemblies 48, 46 provides a constant drive propulsion ratio relative to movement of first and second hand-rim assemblies 32, 36. If differential gearing assemblies 46, 48 of wheelchair 10 are embodied with a 2:1 gearing arrangement, selective operation of first and second hand-rim assemblies 32, 36 results in a 2:1 drive propulsion ratio of wheelchair 10. Hence, when arresters 83a, 83b are connected to wheelchair 10, an occupant (not shown) can selectively operate first and second hand-rim assemblies 32, 36 to manoeuvre wheelchair 10, using half the effort to that required to manoeuvre wheelchair 10 by using first and second drive wheels 22, 26. Thus, an occupant can selectively choose to manoeuvre wheelchair 10 by using drive wheels 22, 26 (as is conventional), or instead by using hand-rim assemblies 32, 36 at a 2:1 drive ratio.

Figure 14A:
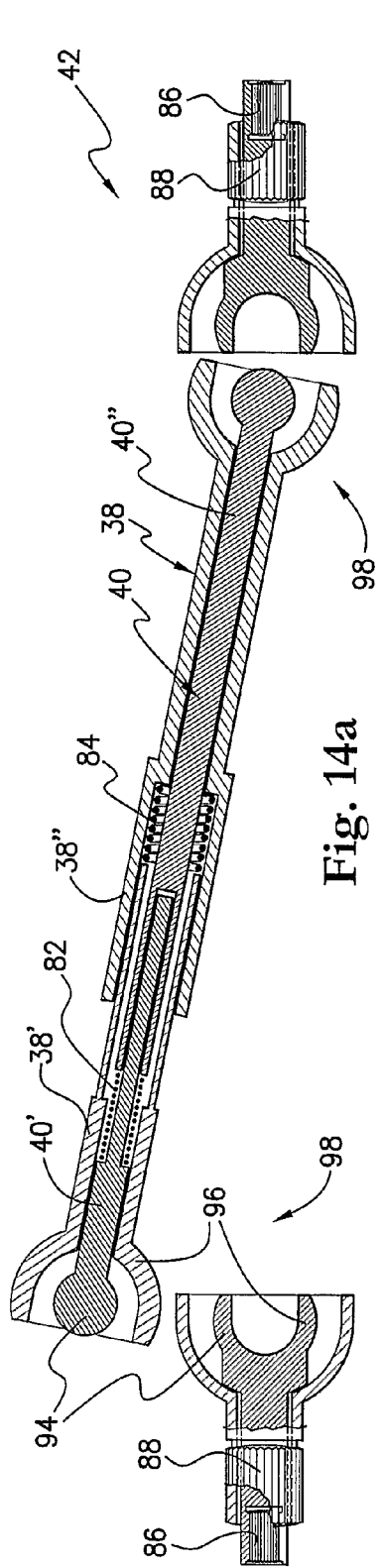
FIGS. 14a to 14c are cross-sectional views of an alternative preferred axle assembly for use with any one of the wheeled conveyances of FIGS. 1 to 10b, showing the axle assembly in various positions.
Figure 14B:
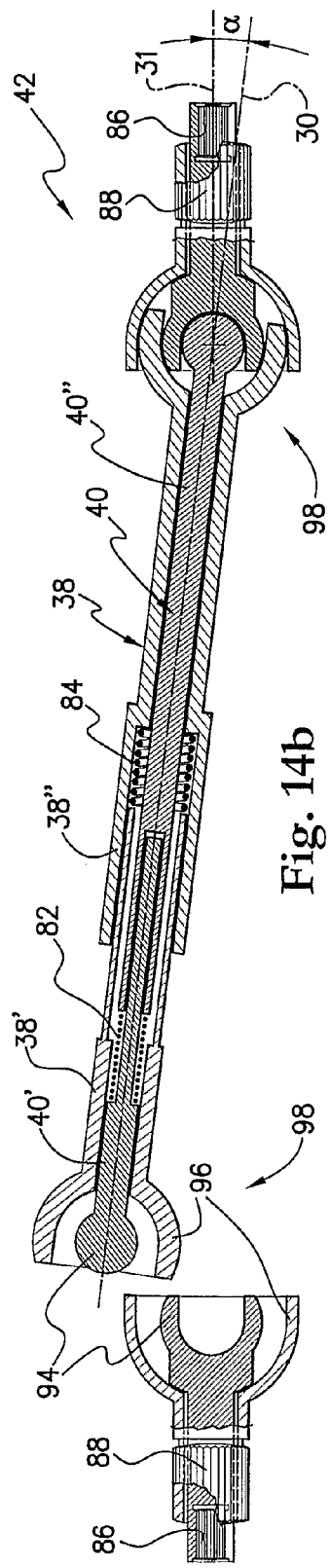
Figure 14C:
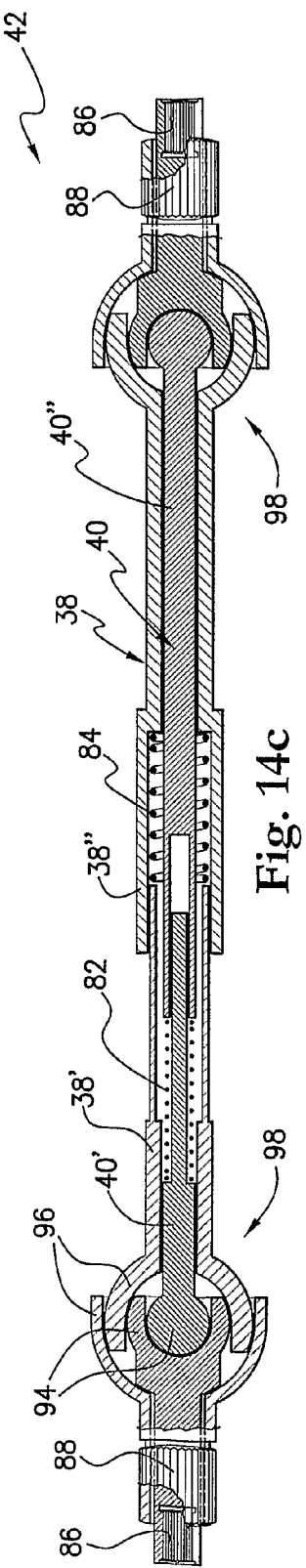

In FIGS. 14a to 14c there are shown various views of a further preferred embodiment of a dual axle assembly 42 made in accordance with the present invention. Dual axle assembly 42 includes inner and outer axles 40, 38, each having respective first and second (female and male) telescoping sections 38', 38", 40', 40", similar to those described with reference to FIGS. 11a & 11b. Thus dual axle assembly 42 of FIGS. 14a to 14c is also retractable when required by means of sections 38', 38", 40', 40" and first and second springs 82, 84. Where dual axle assembly 42 of FIGS. 14a to 14c varies from the axle assembly 42 shown and described with reference to FIGS. 11a & 11b, is that axle assembly 42 of FIGS. 14a to 14c includes at opposed ends thereof inner and outer axle universal joints 94, 96. The arrangement of inner and outer axle universal joints 94, 96 is such that dual axle assembly 42 has at each end a dual universal joint 98 which enables each end of axle assembly 42 to pivot freely when, for example, a drive wheel 22, 26 (not shown in FIGS. 14a to 14c), traverses uneven ground. As can be seen in FIG. 14b, dual axle assembly 42 can freely move relative to dual universal joint 98 which means that inner and outer splines 86, 88 can rotate about a wheel axis 31 which is offset from common wheel axis 30 by an angle α. The magnitude of angle α is dependent on how far inner and outer splines 86, 88 have shifted with respect to inner and outer axles 38, 40 relative to dual universal joints 98. Thus, dual universal joints 98 provide the drive wheels 22, 26 of a wheeled conveyance 10 with the ability to drive through an angle a relative to preferably stationary inner and outer axles 38, 40 of dual axle assembly 42.

Although explained in detail as having one dual universal joint 98 arranged at each end of dual axle assembly 42, it is to be understood that axle assembly 42 of a wheeled conveyance 10 could include more than one dual universal joint 98 disposed at any suitable location along axle assembly 42. Similarly, if axle assembly 42 was to be embodied as two separate axles aligned, for example, parallel to one another, each axle may include one or more single universal joint disposed at any suitable location.

Although not shown, any one of the wheeled conveyances 10 of the present invention could also include a disc brake arrangement disposed at any suitable location in order to facilitate selective braking of the wheeled conveyance 10. In a practical preferred embodiment (not shown) selective braking may be effected in association with brake actuators located proximate the armrests of the wheeled conveyance 10 for ease of operation. It should be understood that this is only one of many varying additional arrangements which can be included on any one of the wheeled conveyances 10 of the present invention as hereinbefore described.

Although the preferred embodiment has been described with reference particularly to a wheelchair 10, it should be understood that the improved drive system of the present invention may also be used with many other types of wheeled conveyance having at least two drive wheels interconnected by at least two drive axles. The drive axles need not be located on a common wheel axes 30, but are preferably located coaxially one within another such that an inner 40 and outer 38 dual axle assembly 42 results which can be removably attached to the wheeled conveyance 10, if required, in order to facilitate, for example, collapse of the wheeled conveyance 10.

Finally, it is to be understood that the foregoing description refers merely to preferred embodiments of the invention, and that variations and modifications will be possible thereto without departing from the spirit and scope of the invention.

The invention claimed is:

1. A conveyance, comprising:
   a plurality of wheels including, at least, a first wheel and a second wheel;
   at least two drive axles disposed between said plurality of wheels, said at least two drive axles including a first drive axle and a second drive axle, said first wheel being rotatably mounted to a first end of said first drive axle and said second wheel being rotatably mounted to a first end of said second drive axle with said first drive axle and said second drive axle being coaxially disposed between said first wheel and said second wheel and said first drive axle coaxially disposed within said second drive axle;
   first actuation means for said first drive axle, said first actuation means being located on a second end of said first drive axle from said first wheel and proximate said second wheel, said second end of said first drive axle being an end opposite said first end of said first drive axle; and,
   second actuation means for said second drive axle, said second actuation means being located on a second end of said second drive axle from said second wheel and proximate said first wheel, said second end of said second drive axle being an end opposite said first end of said second drive axle,
   wherein said first actuation means is selectively operable for applying selective relative rotation to said first wheel and said second actuation means is selectively operable for applying selective relative rotation to said second wheel.

2. The conveyance according to claim 1, further comprising means for collapsing said conveyance for reducing overall dimensions of said conveyance for ease of portability.

3. The conveyance according to claim 1, wherein said first drive axle and said second drive axle are removably disposed between said first wheel and said second wheel.

4. The conveyance according to claim 3, wherein said first drive axle and said second drive axle each include telescoping sections for selectively reducing overall length of said first drive axle and said second drive axle for enabling an occupant to remove said first drive axle and said second drive axle from said conveyance.

5. The conveyance according to claim 4, wherein said telescoping sections of said first drive axle and said second drive axle each cooperate with at least one means for biasing said telescoping sections to a fully extended position.

6. The conveyance according to claim 5, wherein said at least one means for biasing biases said first axle drive and said second axle drive to a fitted position between said first wheel and said second wheel of said conveyance, wherein said fitted position of said first axle drive and said second axle drive is substantially that of said fully extended position.

7. The conveyance according to claim 5, wherein said first axle drive and said second axle drive are each lockable in a collapsed position via locking means for facilitating removal of said first drive axle and said second drive axle from said conveyance.

8. The conveyance according to claim 1, wherein at least one of said first actuation means and said second actuation means is coupled to said first drive axle and said second drive axle, respectively, via at least one gearing assembly.

9. The conveyance according to claim 8, wherein said at least one gearing assembly is disposed within a hub of at least one of said first drive axle or said second drive axle.

10. The conveyance according to claim 8, wherein said at least one gearing assembly is at least one differential.

11. The conveyance according to claim 10, wherein said at least one differential includes at least two bevel gears associated with at least one pinion gear.

12. The conveyance according to claim 10, wherein said at least one differential is a planetary gear system including at least one ring gear associated with at least one planet gear and at least one sun gear.

13. The conveyance according to claim 10, wherein said at least one differential provides a 2:1 drive propulsion ratio.

14. The conveyance according to claim 10, wherein each of said first actuation means and said second actuation means is coupled to a respective said first drive axle or said second drive axle via at least one differential.

15. The conveyance according to claim 14, wherein each said differential coupled to each of said first drive axle and said second drive axle is lockable via at least one arrester that is removably attached to said conveyance for providing a predetermined drive propulsion relative to usage of said first actuation means and said second actuation means.

16. The conveyance according to claim 10, wherein only one of said first actuation means and said second actuation means is coupled to a respective said first drive axle or said second drive axle via said at least one differential and said first actuation means or said second actuation means not coupled to a respective said first drive axle or said second drive axle is directly mounted to a respective said first drive axle or said second drive axle.

17. The conveyance according to claim 8, wherein each of said first actuation means and said second actuation means is coupled to a respective said first drive axle or said second drive axle via at least one gearing assembly.

18. The conveyance according to claim 8, wherein only one of said first actuation means and said second actuation means is coupled to a respective said first drive axle or said second drive axle via said at least one gearing assembly and said first actuation means or said second actuation means not coupled to a respective said first drive axle or said second drive axle is directly mounted to a respective said first drive axle or said second drive axle.

19. The conveyance according to claim 1, further comprising hand-rail means for each of said first wheel and said second wheel.

20. The conveyance according to claim 19, wherein said hand-rail means for each of said first wheel and said second wheel is removably coupled to its respective said first wheel and said second wheel.

21. The conveyance according to claim 1, wherein each of said first drive axle and said second drive axle includes at least one universal joint disposed at, or near, outer ends thereof.

22. The conveyance according to claim 21, wherein said universal joints allows said first wheel and said second wheel to freely move in all directions relative to said first drive axle and said second drive axle.

* * * * *